May 14, 1935.  H. WILLIAMS  2,001,443
AUTOMOBILE DOORLOCK
Filed March 2, 1934   2 Sheets-Sheet 1
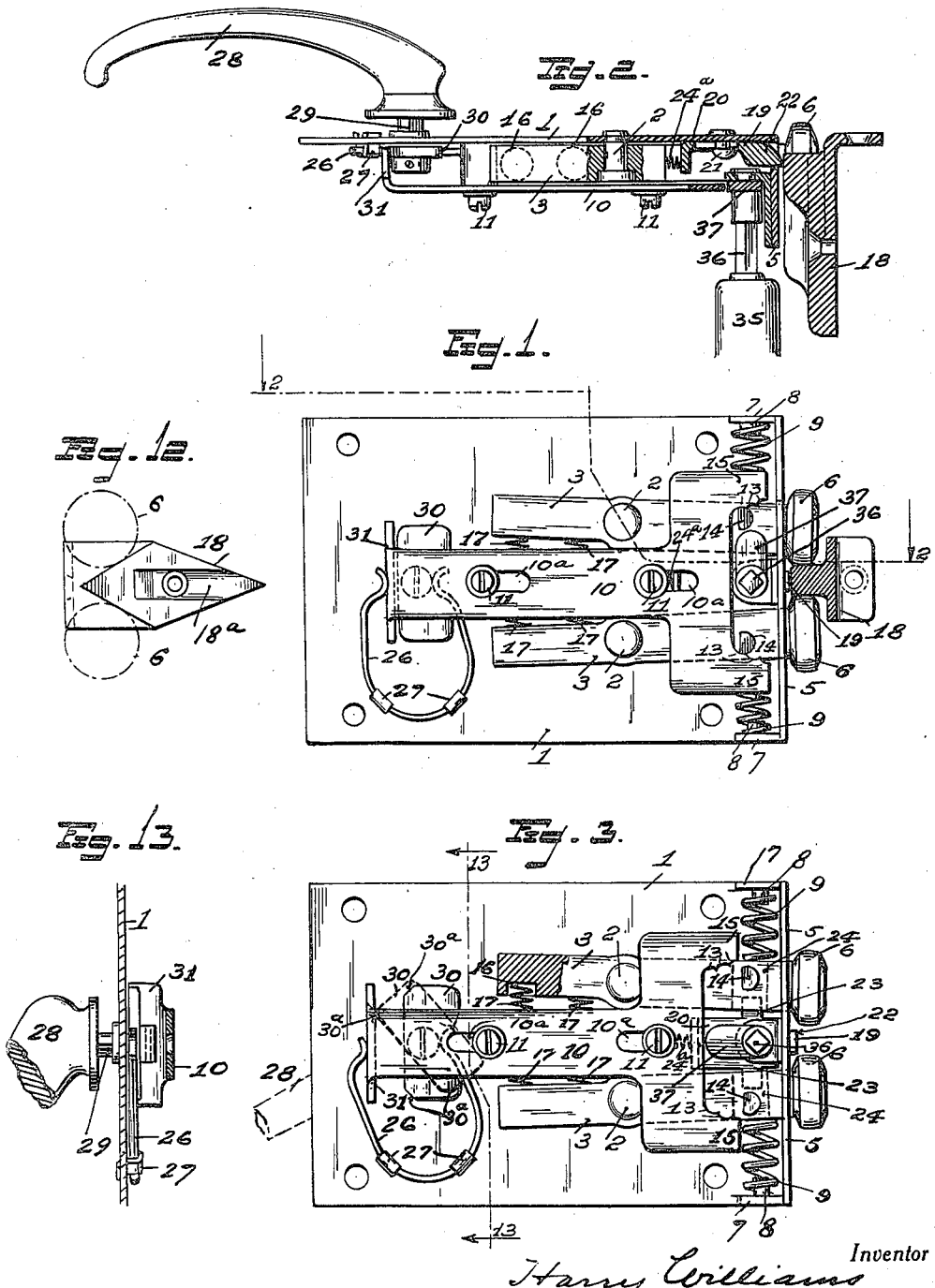
Inventor
Harry Williams
By S. E. Thomas
Attorney

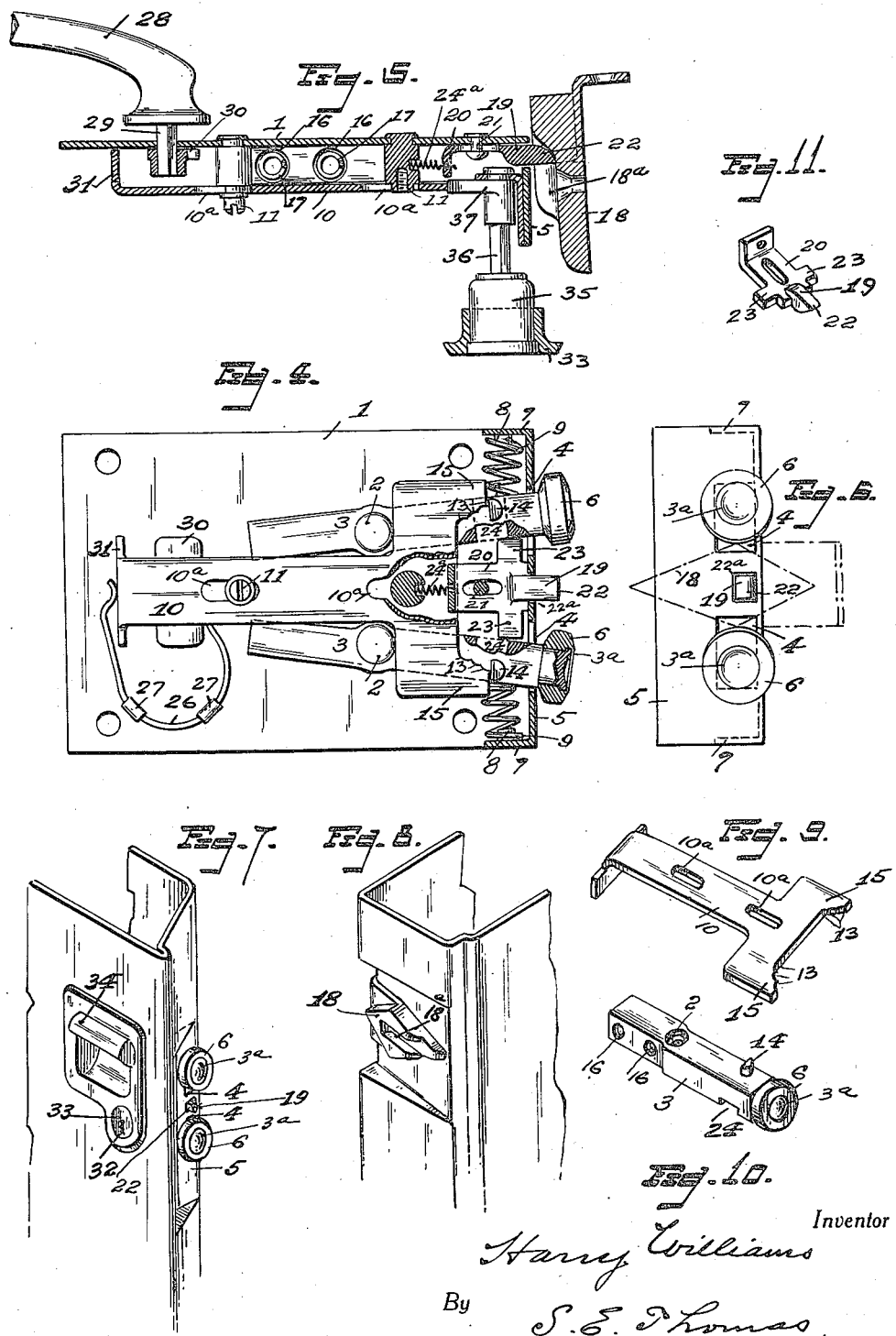

Patented May 14, 1935

2,001,443

UNITED STATES PATENT OFFICE 2,001,443

AUTOMOBILE DOORLOCK

Harry Williams, Detroit, Mich.

Application March 2, 1934, Serial No. 713,696

3 Claims. (Cl. 292—333)

My invention relates to a door lock, and more especially an automobile door lock, shown in the accompanying drawings and more particularly described in the following specification and claims.

The primary object of this invention is to provide a locking mechanism which will automatically lock the door when closed, upon entering or leaving the vehicle.

A further object of the invention is the elimination, from outside of the door, of all lock releasing devices,—such as a rocking lever or rotatable knob, commonly employed in releasing the door locking mechanism from outside the car when the door is closed,—the locking mechanism in the present instance is released from the outside only through the insertion of a proper key.

A further object of the invention is the inclusion of means whereby any tendency of the door or lock to rattle while the car is moving is overcome, the construction being such that "play" due to loosely fitting elements is automatically eliminated.

Another feature of the invention is that while the door can only be opened from outside, by a suitable key,—the door may be opened from the inside by the occupants of the car upon tilting a rocking lever.

With the foregoing and other objects in view which will appear as the description proceeds the invention further resides in the combination and arrangement of parts and in the details of construction hereinafter described and claimed, it being understood that changes may be made in the precise embodiment of the invention herein disclosed without departing from the spirit of the same.

In the drawings accompanying this specification:—

Figure 1 is an elevation of the locking mechanism and indicates the position occupied by a slidable bifurcated locking bar when engaging a pair of rocking arms fitted with rollers at one end, which in turn impinge upon a diamond-shaped keeper, secured to the door casing, for locking the door in its closed position.

Figure 2 is an edge view of the lock, shown partly in elevation and partly in section,—taken on or about line 2—2 of Figure 1,—as viewed in the direction indicated by the arrows.

Figure 3 is an elevation—with parts in section—of the locking mechanism, as it would appear when the door is closed, but with the slidable bifurcated locking bar retracted by a key (not shown) or by a tilting lever on the inside of the door, indicated in dotted lines, that the door may be either pushed or pulled to an open position.

Figure 4 is an elevation of the locking mechanism,—with parts broken away and in section, to more clearly disclose the operating mechanism,—showing the rocking arms, fitted with rollers at their outer ends, held in an unlocked position, as when the door is about to be opened or closed.

Figure 5 is a longitudinal sectional view taken on a horizontal, substantially medial line, through Figure 4.

Figure 6 is a diagrammatic view, showing the rollers on the end of the rocking arms in an unlocked position as they pass over the apex of the diamond-shaped keeper.

Figure 7 is a fragmentary perspective view of an automobile door, viewed from the outside, showing the gripping hand plate—which includes the escutcheon of a lock—for manually pulling the door to an open position, when the lock is released through the application of a suitable key.

Figure 8 is a fragmentary perspective view of the door casing, showing the diamond-shaped keeper attached thereto,—to co-ordinate with the rollers mounted on the projecting ends of the supporting rocking arms when impinged by the rollers in locking the door.

Figure 9 is a perspective view of the slidable bifurcated locking bar, detached from the co-operating lock mechanism, showing the stepped seats in the respective forked members of the bar, for progressively engaging the upstanding lugs,—respectively carried by the rocking arms to maintain the rollers mounted on the ends of the arms in impinging contact with the walls of the diamond-shaped keeper, thereby avoiding any tendency of the parts to rattle when the car is in motion.

Figure 10 is a perspective view of one of the rocking arms and roller rotatably mounted on the end of the bar.

Figure 11 is a perspective view of a slidable latch member having projecting arms which are adapted to maintain the rocking arms in unlocked position,—as in Figure 4.

Figure 12 is an elevation of the diamond-shaped keeper,—showing diagrammatically the relative location of the rollers on the ends of the rocking arms,—to the keeper,—when the door is locked.

Figure 13 is a fragmentary elevation and crosssectional view taken on or about line 13—13 of Figure 3,—viewed as indicated by the arrows.

Referring now to the reference numerals placed upon the several parts of the device disclosed by the drawings:—

The numeral 1, indicates a face-plate adapted to be supported in the wall of a door. Pivoted upon posts 2—2 rising from the face-plate 1, and in spaced relation to each other, are respectively mounted a pair of rocking arms 3—3, the forward ends of which extend through slots 4, in a substantially right-angle extension 5 of the face-plate. Rotatably mounted on the ends of the rocking arms are a pair of rollers 6—6.

To secure and journal the rollers 6—6 upon the arms, the ends of the latter may be flared (3ª) to overlap recessed flanges within the rollers,—see Figure 4;—any suitable means however may be employed for mounting the rollers on the end of the rocking arms.

Projecting inwardly on the return bends 7—7 of the face-plate, are lugs 8—8. A pair of coiled springs 9—9, bearing upon the outer ends of the respective rocking arms 3—3, are held at their opposite ends against displacement by the lugs 8—8. A bifurcated slidable bar 10, is slotted as indicated at 10ª—10ª, for the passage of bolts 11—11 supported in the face-place 1,—the bolts 11—11 serving to guide the slidable bifurcated locking bar 10 medially between the rocking arms 3—3. The opposing edges of the forked tines 15—15 of the bifurcated locking bar 10 are progressively notched (13),—as indicated.

Rising from the outer face of the rocking arms 3—3 are lugs 14, adapted to be progressively seated in the opposing notches 13, on the inner edges of the forked tines 15, of the bifurcated slidable bar 10,—the door in closing being thus securely held against rattling while the car is moving, as hereafter more fully explained.

Respectively seated in pockets 16, formed in the opposing rocking arms 3, are springs 17—17,—their function, together with that of the coil springs 9—9, bearing upon the outer ends of the respective rocking arms,—is to force the rollers 6—6 at the outer ends of the rocking arms toward each other that they may impinge upon the inclined walls of a diamond-shaped keeper 18,—secured to the casing of the door,—upon closing the latter.

A spring actuated releasing latch member 19, embodying a plate 20,—slotted to receive a retaining rivet 21 extending from the face plate 1,—has an abutting or thrust-finger 22, projecting through a medial slot 22ª, in the right-angle end 5, of the face plate.

Extending in opposite directions from the plate 20, of the releasing latch member, are arms 23—23, adapted to hold the rocking arms 3—3 in retracted position,—see Figure 4—but on pushing the latch member 19 backwardly against the action of the spring 24ª, due to the thrust-finger 22 contacting with the wall of the keeper 18, the arms 23—23 of the spring actuated releasing latch member 19 will register with the recesses 24—24 in the rocking arms 3—3, whereupon by the urge of the springs 9—9 and 17—17, the rocking arms will be forced toward each other,—their respective rollers 6—6 gripping the walls of the keeper 18,—see Figure 1.

Under the urge of a spring 26, secured by clips 27 to the face-plate 1, bearing on the end of the slidable bifurcated lock bar 10, the latter is forced outwardly,—see Figure 1—and the stepped recesses 13, formed in the opposing walls of its projecting tines, will progressively overlap the lugs 14, extending outwardly from the rocking arms 3—3, thereby securing the rollers 6 of the rocking arms in contact with the inclined walls of the keeper,—see Figure 12—thus securely locking the door in its closed position and against rattling.

When it is desired to open the door,—either from the inside or outside of the vehicle,—the bifurcated slidable bar 10 must be pushed backwardly from the position occupied in Figure 1 to that indicated in Figure 3, that the stepped or notched (13) tines may free the upstanding lugs 14, of the rocking arms. This may be accomplished from the inside of the car by manually rocking the controlling lever 28, thereby turning its projecting squared shaft 29, carrying the arm 30, which upon rocking the lever, bears against a downwardly extending flange 31, at the end of the slidable bifurcated bar 10, shifting the slidable bifurcated bar from the position indicated in Figure 1,—where it was forced under the urge of the spring 26,—to the position indicated in Figure 3.

The bifurcated locking bar 10 may also be shifted, from the outside of the car, from the position occupied in Figure 1 to that indicated in Figure 3, upon inserting a suitable key in the key-opening 32, in the lock escutcheon 33, fitted in the door-pull plate 34, in turn secured to the outside of the door,—and whereby the door may be pulled to an open position upon releasing the lock.

A lock barrel 35, inclosing suitable lock mechanism,—not shown—is supported in the wall of the door;—from the lock mechanism extends a squared shaft 36, on which is fitted a rocking arm 37—see Figures 1, 2 and 3. Upon the operation of a suitable key inserted in the lock-barrel, the squared shaft 36, carrying the rocking arm 37, may be turned from the position shown in Figure 1, to that indicated in Figure 3, wherein the bifurcated slidable bar 10 is pushed backwardly against the urge of the spring 26, thus releasing the upstanding lugs 14 carried by the rocking arms from locked relation with the bifurcated slidable bar.

As shown in Figure 4, the locking mechanism is held in an unlocked position while the door is opened by the upstanding lugs 14 of the rocking arms 3—3 bearing against the ends of the projecting tines 15—15 of the slidable bifurcated bar 10 against the forward urge of the spring 26;—said rocking arms 3—3 being held in a separated position by the opposing arms 23 of the latch member 19, when the latch member 19 is moved forward into slot 18ª of keeper 18, by the spring 24ª, (see Figure 5) as the door is opened.

Having now indicated the several parts of the device by reference numerals, its construction and operation will be readily understood.

Assuming the door to be closed and locked,—as indicated in Figure 1—the rollers 6—6, mounted on the end of the rocking arms 3—3, bear upon the inclined faces of the keeper 18,—as diagrammatically indicated in Figure 12. It will be noted that the tines of the slidable bifurcated bar 10,—see Figure 1—overlap the upstanding lugs 14—14 of the rocking arms; and due to the stepped recesses (13) in the tines, the rollers 6—6—carried by the rocking arms—are forced into progressively intimate relation with the inclined edges of the diamond-shaped keeper 18, thereby locking the door and preventing any tendency for "play" that might permit the parts to rattle when the car is in motion.

When it is desired to open the door of the car, the locking mechanism may be released from the inside of the car by bearing down upon the controlling lever 28, carrying a rocking arm 30 which upon rocking the lever, bears against the flange 31 at the end of the slidable bifurcated bar 10, forcing the latter to the position indicated in Figure 3. The door now may be pushed to an open position, the diamond-shaped keeper 18 serving to spread the rocking arms 3—3 from the position occupied in Figure 3 to that indicated in Figure 4, whereupon the upstanding lugs 14, carried by the rocking arms 3—3, overlap the tines 15 of the bifurcated slidable bar and are thus held in open position until released. Upon the rocking arms 3—3 being forced to the position indicated in Figure 4, the arms 23 of the releasing latch member are freed from the recesses or sockets 24—24 in the rocking arms, whereupon the spring 24ª forces the releasing latch member and its projecting thrust-finger 22, extending through a medial slot 22ª in the end flange of the face-plate, to the limit of its movement. The arms 23, of the spring actuated latch member bearing now against the respective rocking arms 3—3, hold them in a retracted position until automatically released through the act of closing the door. Upon closing the door, the thrust-finger 22 contacting with the wall of the keeper 18,—see Figures 1, 2, 7 and 8,—forces the spring actuated latch member inwardly whereby the projecting arms 23—23 are again brought into registration with the recesses or sockets 24—24 of the rocking arms 3—3, whereupon the springs 9—9 and 16—16 bearing upon the rocking arms, force the rollers 6 toward each other as they traverse the inclined faces of the keeper 18; and having passed the apex of the inclined keeper,—as indicated in Figure 6—the rollers, contacting with the inclined surface, secure the door in locked position until again released by the controlling lever 28, as previously explained, or by the insertion of a suitable key in the key-opening 32, controlling the lock mechanism which, when actuated, rocks the shaft 36, carrying the arm 37, thereby forces the slidable bifurcated bar 10 from the position occupied in Figure 1 to that indicated in Figure 3,—whereupon the door may be manually swung by the door-pull plate 34 to an open position for entering the car. Upon closure of the door, it will again be automatically locked in its closed position.

If desired the corners 30ª of the arm 30,—see Figure 3—may be flattened so that upon rocking the controlling lever 28 to bear upon the downwardly directed flange 31 at the end of the slidable bifurcated bar 10,—to shift the bar from the locking position indicated in Figure 1, to the unlocked position presented in Figure 3;—the flattened corners 30ª of the arm will serve to hold the bifurcated bar temporarily in unlocked relation to its co-ordinating parts if desired.

Having thus described my invention, what I claim is:—

1. In a vehicle lock, the combination of a lock casing; a pair of rocking arms, pivoted to a wall of the casing in spaced relation to each other, having laterally extending lugs integral therewith, with one end of each arm extending through a wall of the casing; a plurality of springs bearing upon the respective arms, adapted to force the ends of the arms in impinging relation with a keeper, designed to spread the rocking arms, whereby they may interlock with the keeper; a slidable bifurcated bar, adapted to maintain the rocking arms in adjustable locked relation with the keeper, said bifurcated bar medially located between the rocking arms, and slotted for the passage of bolts, the tines of said bar having opposed inclined edges progressively notched to gradually receive and interlock with the lugs of the rocking arms; bolts extending through the slots in the bifurcated bar into the wall of the lock casing; a spring for yieldingly maintaining the bifurcated bar at the limit of its movement; manually operated means for shifting the bifurcated bar against the urge of the spring; and automatically actuated means for maintaining the rocking arms in an unlocked relation to the keeper until released through the act of closing the door.

2. In a vehicle door lock, a lock casing; a pair of rocking locking arms pivoted to the casing, having sockets to receive the arms of a spring actuated latch member, with one end of each rocking locking arm extending through slots in the casing to engage a keeper; a lug projecting from each rocking locking arm; a slidable bifurcated bar having inclined notched tines adapted to coordinate with the lugs of the rocking locking arms, whereby said arms may be held in locking engagement with a keeper adapted to coordinate with the rocking locking arms to lock a door; and a spring actuated latch member having laterally extending arms adapted to automatically maintain the rocking locking arms in unlocked relation to the keeper, said latch member having a thrust finger, extending through the wall of the casing, whereby it may contact a keeper to shift the latch on closing the door, that the arms of the latch member may enter the sockets in the rocking locking arms, thereby releasing the arms that they may interlock with the keeper.

3. In a vehicle door lock, a lock casing; a pair of rocking locking arms pivoted to the casing, with one end of each arm projecting through the casing to engage a keeper, said arms having lugs adapted to coordinate with the tines of a slidable bar; a spring-actuated bifurcated slidable bar, having inclined notched tines, adapted to progressively receive the lugs of the rocking locking arms, whereby rattling due to play may be eliminated between the rocking arms and keeper; and a spring actuated latch member, adapted to hold the rocking arms in an unlocked position, said latch member having a thrust finger projecting from its body portion through the lock casing to engage a portion of the keeper, whereby upon contacting with the keeper in closing the door, the latch member is forced backwardly, thereby releasing the rocking arms that they may automatically interlock with the keeper.

HARRY WILLIAMS.